United States Patent
Gunn

(10) Patent No.: US 9,822,043 B2
(45) Date of Patent: Nov. 21, 2017

(54) LIQUID FERTILIZER SYSTEM

(71) Applicant: Kevin Gunn, Devens, MA (US)

(72) Inventor: Kevin Gunn, Devens, MA (US)

(*) Notice: Subject to any disclaimer, the term of this patent is extended or adjusted under 35 U.S.C. 154(b) by 195 days.

(21) Appl. No.: 14/937,087

(22) Filed: Nov. 10, 2015

(65) Prior Publication Data

US 2017/0129821 A1    May 11, 2017

(51) Int. Cl.
| | |
|---|---|
| C05F 17/02 | (2006.01) |
| C12M 1/00 | (2006.01) |
| C05F 17/00 | (2006.01) |
| C05G 3/00 | (2006.01) |
| A01C 23/04 | (2006.01) |

(52) U.S. Cl.
CPC ........ C05F 17/0235 (2013.01); A01C 23/047 (2013.01); C05F 17/0018 (2013.01); C05G 3/0076 (2013.01)

(58) Field of Classification Search
CPC .. C05F 14/0235; C05F 14/0018; C05F 14/02; C05F 14/027; C05F 14/0247; C05F 14/0229; C05G 3/0076; B09B 3/00; A01C 23/047
USPC .......................................... 435/290.1; 47/1.4
See application file for complete search history.

(56) References Cited

U.S. PATENT DOCUMENTS

| | | |
|---|---|---|
| 3,165,394 A | 1/1965 | Raising |
| 3,778,233 A | 12/1973 | Blough et al. |
| 4,203,755 A | 5/1980 | Ruckstuhl |
| 5,076,210 A | 12/1991 | Horn |
| 5,187,097 A | 2/1993 | Weber et al. |
| 5,945,332 A | 8/1999 | Fors |
| 6,325,311 B1 | 12/2001 | Preisser |
| 6,649,405 B2 | 11/2003 | Alms et al. |
| 7,972,839 B2 | 7/2011 | Wilson |
| 2004/0032032 A1 | 2/2004 | Erickson |
| 2010/0236308 A1 | 9/2010 | Gunn et al. |
| 2013/0167602 A1 | 7/2013 | Blake |

FOREIGN PATENT DOCUMENTS

| | | |
|---|---|---|
| CA | 2073348 | 7/1991 |
| CA | 2 362 983 | 8/2000 |
| CA | 2 617 086 | 7/2009 |
| WO | 2004022508 | 3/2004 |

*Primary Examiner* — Michael Hobbs
(74) *Attorney, Agent, or Firm* — Lambert & Associates; Gary E. Lambert; David J. Connaughton, Jr.

(57) ABSTRACT

A system for the continuous production of a liquid fertilizer is provided. The system operates by feeding a compost material at a continuous rate to an extractor. The extractor uses a belt system to convey the compost along a path. Sprayers above the belt spray water or similar liquid water based substance onto the compost. The water absorbs nutrients and other components of the compost and is then drained through the belt to a receptacle to store the liquid fertilizer.

20 Claims, 2 Drawing Sheets

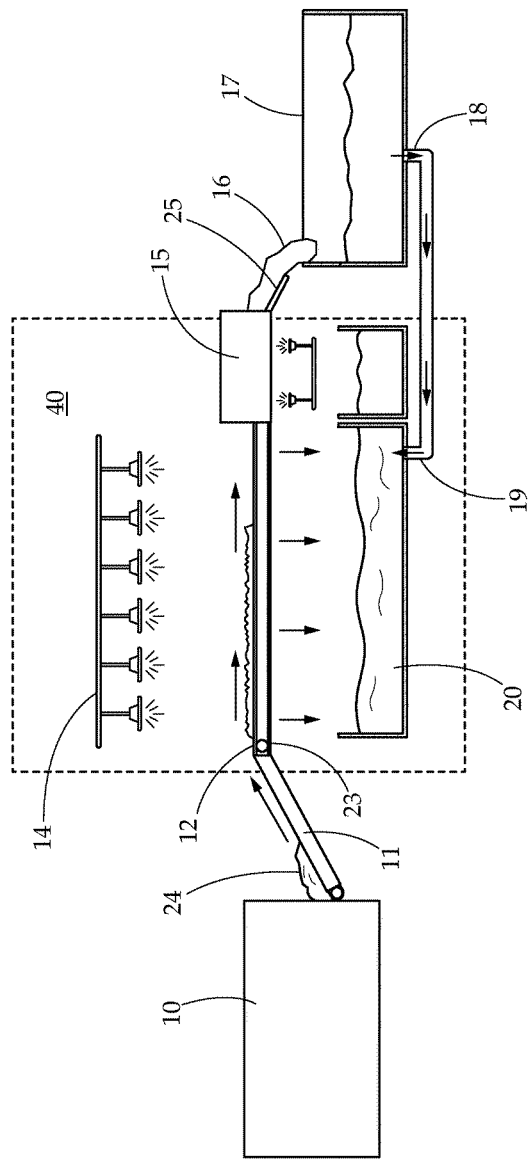
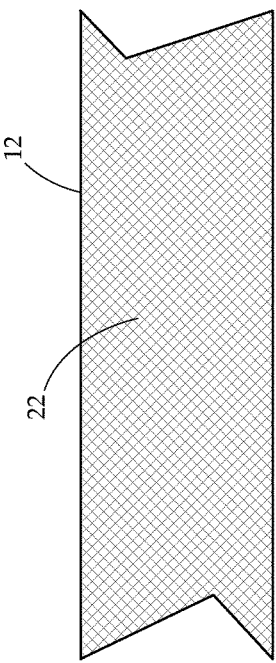
Fig. 1
Fig. 2

LIQUID FERTILIZER SYSTEM

BACKGROUND OF THE INVENTION

Field of the Invention

The present invention relates generally to a system for generating liquid fertilizer. More particularly, the present invention relates to a continuous process for production of liquid fertilizer.

Description of Related Art

It has been known to produce liquid compost as a liquid fertilizer, which is a suspension containing water and composted organic material, such as wood chips and/or animal waste. Liquid compost is typically dispensed through an irrigation system, or through some other spray device, so that the material can be spread over a large area of crops, turf, and/or ornamental plants.

In the prior art, liquid compost has been produced in a batch process. That is, a quantity of organic matter is placed in a vessel, and is then combined with water. The material may be stirred until the desired consistency is reached. The resulting suspension is liquid compost, which is removed from the vessel, at which point another batch can be made. The device used to make the liquid compost is known as an extractor, because the product is extracted from the organic material.

The compost extractors of the prior art are essentially batch processors. While attempts to automate the process have been proposed, the automation has been limited to the use of conveyors to deliver organic material to the extractor. The devices of the prior art cannot be used to produce liquid compost on a continuous basis. Moreover, the task of delivering organic material to the extractor, and removal of spent organic material, is a labor-intensive process which has not been automated in prior art devices. Also, the making of liquid compost is an inherently messy procedure, and creates a disposal problem.

The same problems are encountered in the making of "compost tea", which is similar to liquid compost, except that the water used to make the product has an oxygen content sufficient to support the growth of microorganisms. A compost tea is typically made by supplying a kit which includes a "tea" bag containing compost, with the addition of other chemicals, and brewing the "tea" in liquid, in the presence of oxygen, for an extended period of time. The resulting compost tea may be used as a fertilizer, or as a composition for preventing plant diseases.

Therefore, what is needed is a system that may efficiently and effectively provide a continuous process to produce the desired liquid fertilizer.

SUMMARY OF THE INVENTION

The subject matter of this application may involve, in some cases, interrelated products, alternative solutions to a particular problem, and/or a plurality of different uses of a single system or article.

In one aspect, a system for the continuous production of liquid fertilizer is provided. The system includes a compost feed source, an extractor to produce liquid fertilizer from compost of the compost feed source, and a discharge area. The compost is fed to the extractor by a conveyor. The extractor may have a continuous belt configured to revolve about a roller. The belt is driven by a drive source such as a motor. This belt has a plurality of apertures in its surface that allow water to pass through the belt. Water sources are positioned above the belt and are configured to provide water to the belt and any compost positioned on top of the belt. The water may then collect nutrients, biologics, and other materials from the compost, and pass through the belt. A collection area is positioned to collect the water (which is now a liquid fertilizer by virtue of its collection of components from the compost). A discharge receptacle is positioned at an end of the belt to receive the spent compost after it has been wetted and nutrients extracted.

In another aspect, an irrigation system having a liquid fertilizer input from a liquid fertilizer production system is provided. The irrigation system includes a liquid fertilizer production unit connected to the irrigation system to provide liquid fertilizer directly and continuously, as the liquid fertilizer is produced, to the irrigation system. The fertilizer production unit includes a compost feed source, an extractor to produce liquid fertilizer from compost of the compost feed source, and a discharge area. The compost is fed to the extractor by a conveyor. The extractor may have a continuous belt configured to revolve about a roller. The belt is driven by a drive source such as a motor. This belt has a plurality of apertures in its surface that allow water to pass through the belt. Water sources are positioned above the belt and are configured to provide water to the belt and any compost positioned on top of the belt. A collection area is positioned to collect the water (which is now a liquid fertilizer). This collection area is directly connected to the irrigation system by, for example, a pump, providing direct flow from the collection area for the liquid fertilizer.

BRIEF DESCRIPTION OF THE DRAWINGS

FIG. 1 provides a view of an embodiment of the present invention.

FIG. 2 provides an elevation view of an embodiment of a belt of the present invention.

DETAILED DESCRIPTION

Figure 3:
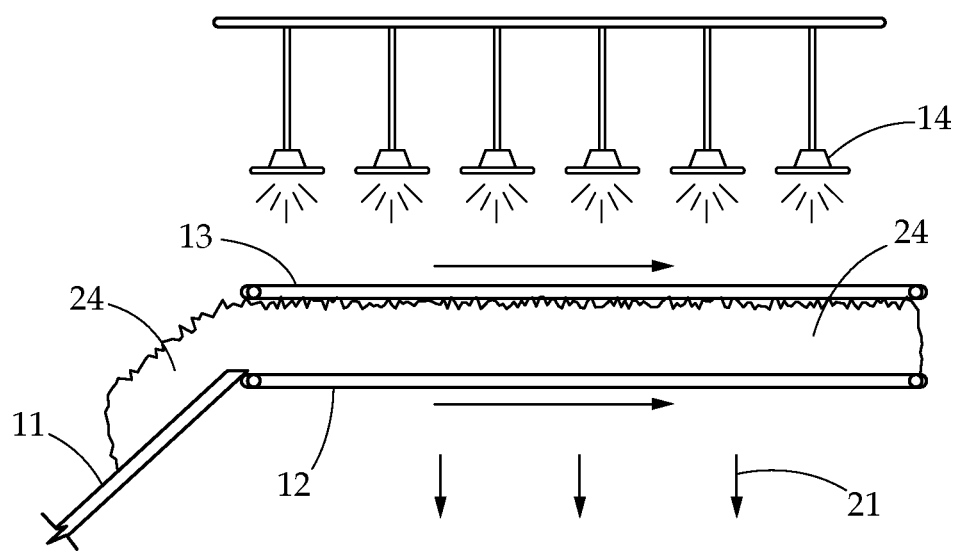
FIG. 3 provides a detail view of another embodiment of the present invention.

The detailed description set forth below in connection with the appended drawings is intended as a description of presently preferred embodiments of the invention and does not represent the only forms in which the present invention may be constructed and/or utilized. The description sets forth the functions and the sequence of steps for constructing and operating the invention in connection with the illustrated embodiments.

Generally, the present invention concerns a continuous process for extracting organisms, nutrients, and beneficial biological elements from a quantity of compost into a quantity of water, forming a liquid fertilizer. The process includes a number of components including a compost source, extraction system, and discharge. The extraction system includes a liquid permeable belt that is configured to move the compost from the compost source past a series of water sources that are poured/sprayed on the compost. As the belt continues on, the water passes through the compost, gathering the organisms, nutrients and biological elements within the compost source. The water may then pass through the belt in the form of a liquid fertilizer into a collection area. After sufficient water exposure, the compost is then spent and sent to a discharge area.

Computerized or other control systems may be coupled to motors controlling the belt, feeders, water feed to the pouring/spraying system, and the like, to control a rate of the feeding and extraction on the system. Further, a plurality of sensors may be deployed throughout the system and connected to the computerized control system to provide further specific control and allow for adjustment of the system.

The liquid fertilizer made by the present invention can be sprayed over crops, or over turf or ornamental plants, or used prior to planting, or it can be dispensed through an irrigation system. In a particular embodiment, the system may be present on site at a farm location, and the extraction system collector that receives the liquid fertilizer may be in direct connection to a local irrigation system such as an agricultural irrigation system. In another embodiment, the liquid fertilizer may be created, and then transported to another location for use. The present invention therefore has a primary object of providing a system and method for making liquid fertilizer in the form of liquid compost or compost tea.

The term "compost", as used herein, may refer to any composted organic material. Organic material sources may include materials such as wood chips, leaves, grass clippings and other discarded organic material, animal waste, food waste, mixtures of these materials, and other organic composted sources. The term "composted" as used herein is defined as to decay or decompose to at least some extent.

The liquid permeable belt may be any planar belt capable of being rotated and driven in a continuous fashion along, for example, rollers or the like, that can allow a fluid to pass through. For example, the belt may be formed of a mesh material, such as plastic, metal, fiberglass, carbon fiber and other composites, and the like. In other embodiments, the belt may be a continuous membrane material having a plurality of apertures formed along its length. In some embodiments, two belts may be used, an upper belt and a lower belt that are facing each other. Both of these belts may be liquid permeable and may have a spacing between them wherein the compost may be deposited. The belts, when moving, thus both guide the quantity of compost between them. In a particular embodiment having two belts, a spacing between he two belts may decrease as the belts move toward an end of the extractor. The belts coming together in this embodiment may aid in squeezing the compost to extract more liquid fertilizer.

In a particular embodiment, structures or motions of the belt may aid in agitating the wetted compost to facilitate transfer of components to the water and to move the water out of the compost through the belt. For example, the belt may shake or otherwise move in an agitating fashion. In another embodiment, baffles or other protrusions on the belt may provide this agitation.

A water source may be positioned to provide water to the compost from the compost source as it moves along the path of the belt conveying the compost. The water source may be any system capable of providing a quantity of water to the compost on the belt. In one embodiment, the water source may be a sprayer or sprayers. In another embodiment, the water source may be a pouring source or sources such as a faucet or the like. In still another embodiment, the water source may be a water jet or jets, or other pressurized source.

A collector or collection area may be positioned below and/or around the belt to collect the water after it has collected the desirable contents of the compost. In many embodiments, the collector may be below the sprayers and belt to use gravity to bring the desirable liquid fertilizer out of the compost and downward to the collector, however this is not necessarily the case. The collector may be any structure or area capable of catching and/or diverting the liquid fertilizer after it leaves the compost. Examples of collectors may include troughs, basins, funnels, barrels, piping, and the like.

A filtration unit may be employed on an outlet of the collector. The filtration unit may be utilized to filter the liquid fertilizer to prevent clogging of downstream delivery applications. Such a filtration unit may be any filter capable of separating compost particles of a particular size from the liquid phase of the liquid fertilizer.

One or more conveyors may be used to bring the compost from a compost source, to the extractor and after the extractor, to the discharge area. The conveyors may be moved by any suitable motor, which may be hydraulic, electric, or gasoline-powered. The motors which drive the conveyors preferably have adjustable speeds, so that the speed of the conveyors can thereby be controlled. The motors are preferably designed so that they can be controlled, at least in part, by the output of a sensor monitoring any part of the system. Sensors may monitor one or more of, for example: water flow rate, conveyor rate, belt rate, spent compost production rate, compost feed rate, liquid fertilizer production rate, and the like.

In many embodiments, the compost source may be from a trailer or other similar bulk storage area. The trailer may be positioned near the conveyor and configured to feed compost to the conveyor and thus to the extractor. Similarly, the discharge area to send the spent compost may be a trailer, or other similar bulk storage area. In one embodiment, the trailer may serve as both the compost source and a discharge area. In this embodiment, the conveyors may both extract the compost from the trailer, and the discharge conveyor may send it back to a different area of the trailer after extraction.

As described above, the embodiment having the combination of the trailer as a source and discharge unit is especially advantageous, because organic matter can be automatically unloaded from the trailer, processed in the extraction unit, and residual organic matter can be automatically returned to the trailer for disposal. However, it is possible to use the extraction unit alone, without the trailer, in which case other means of supplying and removing organic matter must be provided. It is also possible to replace the trailer with some other structure. Furthermore, the residual organic material may be conveyed to a discharge area other than the trailer.

In a further embodiment, a second set of water sprayers or jets may be provided to clean off the belt by spraying the belt to remove the spent compost. This second set of water sprayers may be in a separate section from the main extractor area, to prevent excess cleaning water from diluting the liquid fertilizer. The jets may be oriented in any direction relative to the belt, and may be above, to the side, at an angle, below the belt, or in a region between two potions of the belt in an embodiment wherein the belt wraps around one or a plurality of rollers, among other options.

Instead of using water to remove residual compost from the belt, one could use a stream of air, or a stream which includes both water and air. A mechanical device (not shown) could also be added for assisting in the removal of the residual spent compost.

The invention thus automates the process of making liquid fertilizer, by providing a system in which compost or other organic material is automatically removed from a compost source, and in which liquid fertilizer is made continuously and automatically. Furthermore, the portion of spent compost is automatically returned to the trailer so that it can be carried away.

Turning now to FIG. 1, an embodiment of the continuous liquid fertilizer production system is provided. The extractor 40 of this embodiment is surrounded by a broken line. A compost feed source 10 is provided. A conveyor 11 moves compost 24 from within the feed source 10 to the extractor 40, namely to belt 12 in the extractor 40. Belt 12 is a continuous belt that revolves about rollers 23 and is powered by some motive force such as a motor. Compost can be seen disposed on a top of the belt 12. As the compost moves along the extractor on the belt 12, sprayers 14 (or other equivalent water source) spray a quantity of water downward towards the compost and belt 12. This spraying causes the compost to become filled with water, collecting nutrients, organisms, and biological elements from the compost. Because the belt 12 is liquid permeable, after this collecting, the fluid passes through the belt, and is collected into collection area 20, shown here as a basin. Near an end of the extractor is a belt cleaning area 15 which clears the belt 12 of spent compost 16. This may be achieved by spraying, blowing air, and the like, as discussed above. A spent compost 16 leaves the extractor 40 and is received in a discharge receptacle 17. In this particular embodiment shown, a piping 18 connects to the collection area 20. This piping may collect additional fluid 19 that drains from the spent compost 16 and send this fluid 19 to the collection area 20. However it should be understood that the invention can, of course, operate without this piping 18.

FIG. 2 shows a detail view of an embodiment of the fluid permeable belt. Fluid permeable belt 12 is shown here as a mesh 22 in an elongate planar shape. The belt 12 wraps about at least two rollers allowing it to revolve continuously to allow for the system to operate in a continuous extraction process of producing liquid fertilizer.

FIG. 3 provides a view of another embodiment of a belt configuration of the extractor. In this embodiment, compost 24 is conveyed through the extractor 40 by two belts 12, 13. Bottom belt 12 and top belt 13 operate to sandwich the compost 24 and both may carry the quantity of compost along the extractor. Belts 12, 13 can be operated at the same speed, or at different speeds to, for example, agitate the compost. In a particular embodiment, the belts 12, 13, may be angled towards each other as they reach the end of the extractor to squeeze liquid fertilizer from the water-compost. Each belt 12, 13, is liquid permeable. Water source is shown as sprayers 14. Sprayers 14 provide water to the compost 24, which drains through compost 24 and belts 12, 13, to be collected as liquid fertilizer 21.

Figure 4:
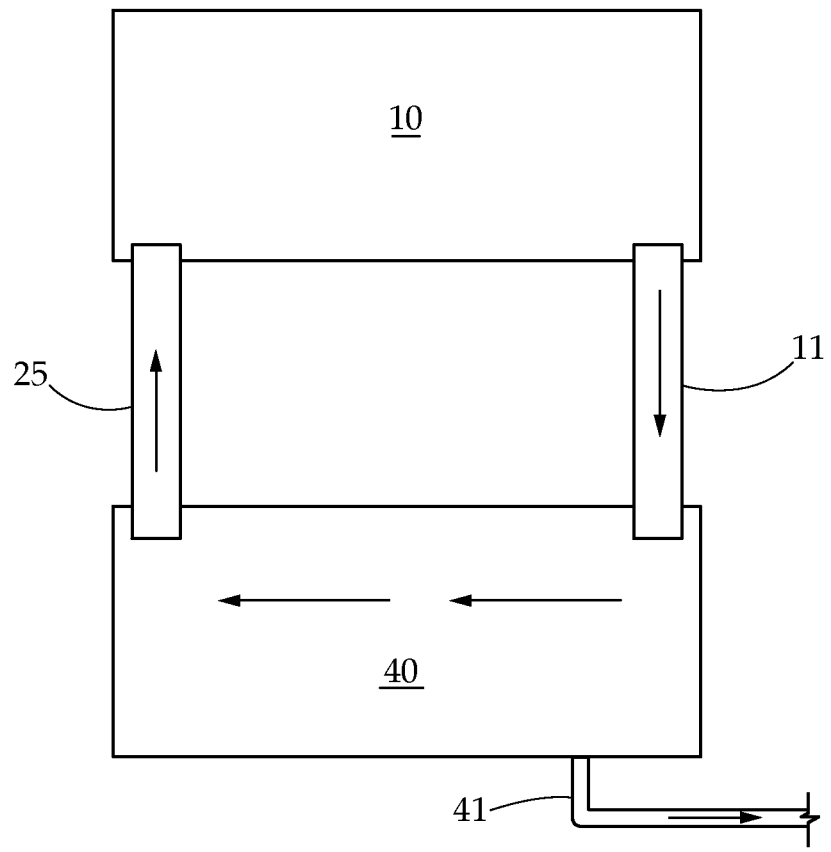
FIG. 4 provides a schematic view of still another embodiment of the present invention.

FIG. 4 provides a schematic view of an embodiment of the present invention where spent compost is returned to the compost source. In this view, compost source 10 is a trailer. The compost is extracted by conveyor 11. Compost is then sent to the extractor 40 where liquid fertilizer is produced, exiting the extractor through piping 41. Spent compost is then transferred back to trailer 10 via conveyor 25.

While several variations of the present invention have been illustrated by way of example in preferred or particular embodiments, it is apparent that further embodiments could be developed within the spirit and scope of the present invention, or the inventive concept thereof. However, it is to be expressly understood that such modifications and adaptations are within the spirit and scope of the present invention, and are inclusive, but not limited to the following appended claims as set forth.

What is claimed is:

1. A system for the continuous production of liquid fertilizer comprising:
   a compost feed source, the compost feed source housing a quantity of compost;
   a conveyor configured to transport at least a portion of the quantity of compost to an extractor;
   the extractor configured to create the liquid fertilizer from the compost, the extractor comprising:
     a continuous belt configured to revolve about a roller, the belt driven by a drive source, the belt configured to receive the quantity of compost from the conveyor;
     wherein the belt further comprises a plurality of apertures in its surface, the plurality of apertures configured to allow fluid to pass through;
     a plurality of water sources configured to provide water to a portion of the quantity of compost positioned on a top surface of the belt, wherein the water can pass through the compost and the belt;
     a collection area positioned to collect the water after passing through the compost and the belt, the water being a liquid fertilizer after passing through the compost; and
   a discharge receptacle positioned to receive the quantity of compost after it reaches an end of the belt.

2. The system for the continuous production of liquid fertilizer of claim 1 wherein the belt is a mesh belt.

3. The system for the continuous production of liquid fertilizer of claim 1 further comprising a second continuous belt positioned above the belt and spaced apart from the belt forming a spacing, the portion of the quantity of compost positioned within the spacing in contact with both the belt and the second belt, the second belt comprising a second plurality of apertures in its surface, the second plurality of apertures configured to allow fluid to pass through.

4. The system for the continuous production of liquid fertilizer of claim 3 wherein the second belt is configured to revolve about a second roller at a same rate as the belt.

5. The system for the continuous production of liquid fertilizer of claim 3 wherein the second belt is configured to revolve about a second roller at a different rate from the belt.

6. The system for the continuous production of liquid fertilizer of claim 3 wherein the belt and second belt converge along their lengths such that the spacing decreases in height.

7. The system for the continuous production of liquid fertilizer of claim 1 wherein the plurality of water sources is a plurality of sprayers.

8. The system for the continuous production of liquid fertilizer of claim 1 wherein the conveyor is configured to provide a continuous input rate of the quantity of compost to the belt.

9. The system for the continuous production of liquid fertilizer of claim 1 wherein the discharge receptacle is the same as the compost feed source.

10. The system for the continuous production of liquid fertilizer of claim 1 further comprising a control system, the control system configured to control a rate of rotation of the belt, and a rate of water flow through the water source.

11. The system for the continuous production of liquid fertilizer of claim 10 wherein the control system comprises a sensor to track a rate of liquid fertilizer production.

12. The system for the continuous production of liquid fertilizer of claim 10 wherein the control system is further configured to control a rate of the conveyor.

13. The system for the continuous production of liquid fertilizer of claim 1 wherein the collection area of the liquid fertilizer is directly connected to an agricultural irrigation system.

14. The system for the continuous production of liquid fertilizer of claim 1 further comprising a filter on an output of the collection area.

15. The system for the continuous production of liquid fertilizer of claim 1 further comprising a second water source, the second water source configured to wash the belt after the quantity of compost has passed to the discharge area.

16. An irrigation system having a liquid fertilizer input from a liquid fertilizer production system comprising:
   the liquid fertilizer production system having a compost feed source, the compost feed source housing a quantity of compost;
   a conveyor configured to transport at least a portion of the quantity of compost to an extractor;
   the extractor configured to create the liquid fertilizer from the compost, the extractor comprising:
      a continuous belt configured to revolve about a roller, the belt driven by a drive source, the belt configured to receive the quantity of compost from the conveyor;
      wherein the belt further comprises a plurality of apertures in its surface, the plurality of apertures configured to allow fluid to pass through;
      a plurality of water sources configured to provide water to a portion of the quantity of compost positioned on a top surface of the belt, wherein the water can pass through the compost and the belt;
      a collection area positioned to collect the water after passing through the compost and the belt, the water being a liquid fertilizer after passing through the compost;
      a discharge receptacle positioned to receive the quantity of compost after it reaches an end of the belt; and
   wherein the collection area of the liquid fertilizer is directly connected to an agricultural irrigation system, a pump providing flow from the collection area to the agricultural irrigation system.

17. The irrigation system having a liquid fertilizer input from a liquid fertilizer production system of claim 16 further comprising a second continuous belt positioned above the belt and spaced apart from the belt forming a spacing, the portion of the quantity of compost positioned within the spacing in contact with both the belt and the second belt, the second belt comprising a second plurality of apertures in its surface, the second plurality of apertures configured to allow fluid to pass through.

18. The irrigation system having a liquid fertilizer input from a liquid fertilizer production system of claim 17 wherein the belt and second belt converge along their lengths such that the spacing decreases in height.

19. The irrigation system having a liquid fertilizer input from a liquid fertilizer production system of claim 16 further comprising a control system, the control system configured to control a rate of rotation of the belt, and a rate of water flow through the water source.

20. The irrigation system having a liquid fertilizer input from a liquid fertilizer production system of claim 16 further comprising a second water source, the second water source configured to wash the belt after the quantity of compost has passed to the discharge area.

* * * * *